United States Patent
Chen et al.

(10) Patent No.: US 11,948,766 B2
(45) Date of Patent: Apr. 2, 2024

(54) ROBUST RESET SWITCH FOR CIRCUIT INTERRUPTERS

(71) Applicant: Ze Chen, Yueqing (CN)

(72) Inventors: Ze Chen, Yueqing (CN); Gui Chen, Wenzhou (CN)

(73) Assignee: Ze Chen, Yueqing (CN)

( * ) Notice: Subject to any disclaimer, the term of this patent is extended or adjusted under 35 U.S.C. 154(b) by 6 days.

(21) Appl. No.: 17/945,050

(22) Filed: Sep. 14, 2022

(65) Prior Publication Data
US 2023/0078318 A1 Mar. 16, 2023

Related U.S. Application Data

(60) Provisional application No. 63/243,940, filed on Sep. 14, 2021.

(51) Int. Cl.
*H01H 71/50* (2006.01)
*H01H 75/04* (2006.01)

(52) U.S. Cl.
CPC ................... *H01H 75/04* (2013.01)

(58) Field of Classification Search
CPC ......... H01H 71/50; H01H 73/30; H01H 73/44
See application file for complete search history.

(56) References Cited

U.S. PATENT DOCUMENTS

| 10,439,387 | B2 | 10/2019 | Chen |
| 10,950,989 | B1 | 3/2021 | Aromin |
| 2018/0083436 | A1* | 3/2018 | Chen ...................... H02H 3/16 |

* cited by examiner

*Primary Examiner* — Ramon M Barrera
(74) *Attorney, Agent, or Firm* — Mei & Mark LLP

(57) ABSTRACT

In one example, a reset switch assembly is provided. The reset switch assembly may include a reset button assembly, a slider, a leaf switch, and a trip coil assembly. The slider may have a at least a first slider position and a second slider position. In the first slider position, the trip coil assembly may engage the slider to the reset button assembly. The leaf switch may be biased to a closed position. In in the second slider position, the slider may maintain the leaf switch in an open position. In another example, a circuit interrupter including the reset switch assembly is provided.

20 Claims, 11 Drawing Sheets

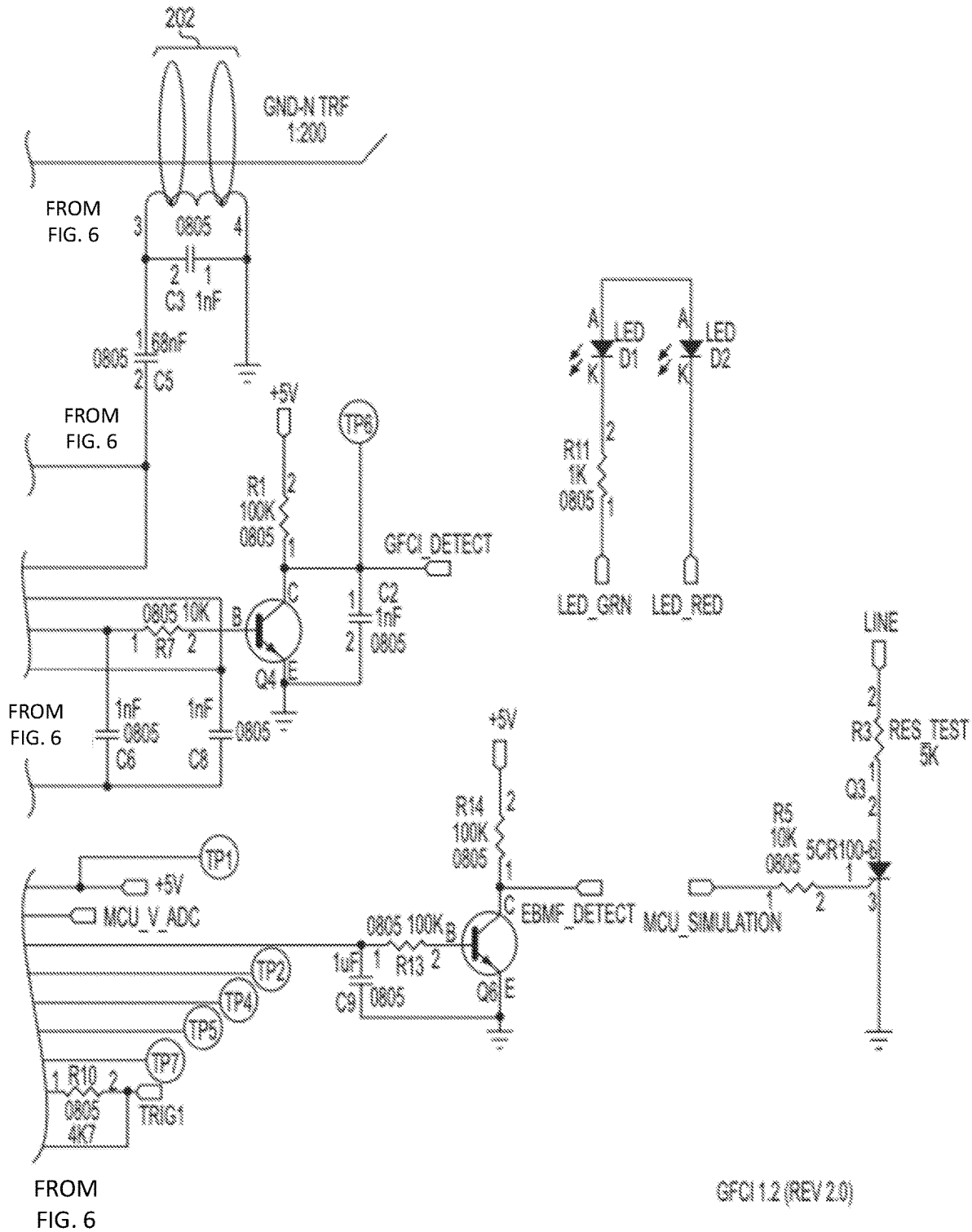
FIG. 6 (PRIOR ART) (CONT.)

E-E

ROBUST RESET SWITCH FOR CIRCUIT INTERRUPTERS

This application claim priority to U.S. Provisional Patent Application No. 63/243,940, filed on Sep. 14, 2021, the disclosure of which is herein incorporated by reference in its entirety.

TECHNICAL FIELD

The present disclosure relates to apparatuses, mechanisms, circuits, systems, and methods to enhance functionality and safety of Circuit Interrupter devices, including, but not limited to, GFCIs, AFCIs, and HCIs. The present disclosure also pertains to Circuit Interrupter devices.

BACKGROUND

Conventional earth current leakage circuit breakers and over-current fuses are commonly deployed to prevent injuries to people and property from dangerous conditions resulting from, for example, current leakages or fires resulting from electrical faults such as current arcs or severe current leakages. Such devices typically detect the occurrence of certain types of electrical faults to prevent harm to persons and property.

Ground faults may be commonly defined as the existence of a current imbalance between the supply and the return path wherein an undesirable and significant amount of the unreturned current is leaking, or passing through an object— for example a human body, to the ground. Notably, the passage of electrical current through the human body may cause injury or even death. Circuit Interrupters that detect and respond to ground faults may be referred to as GFCIs.

A current arc is typically caused by a current surging over separated or poorly contacting electrical surfaces within electrical equipment, for example, in its power cord or in an electrical device itself; or within damaged electrical wiring, such as, within the walls of a building. Current arc electrical faults may be defined as current through ionized gas between the two (e.g., supply-side and load-side) separated or poorly contacting electrical surfaces. Such current arcs are often characterized by sparking and extremely high heat, and as a result can cause electrical fires. For example, electrical fires may start when the heat and/or sparking of a current arc causes insulating material or construction material in the vicinity of the electrical fault to combust. Current arc-caused electrical fires may damage property or even endanger human life. Circuit Interrupters that detect and respond to arc faults may be referred to as AFCIs.

Combination devices that protect users and electrical appliances from both ground faults and arc faults may be referred to as HCI (Hybrid Circuit Interrupters).

In practice, when existing Circuit Interrupter devices are utilized, some electrical faults may not be properly responded to by, for example, halting the provision of electrical power to a socket and/or load. Conversely, such conventional Circuit Interrupter devices may inappropriately halt the provision of electrical power where no actionable electrical fault exists. Some of such errors may occur due to malfunctions of solenoid tripping coils; SCR circuit components; and/or other electrical, mechanical, or electromechanical switches employed by such conventional devices. Moreover, the likelihood of these malfunctions may increase over the life of such conventional devices.

In a typical operation of an AFCI or GFCI or Combo solutions, for example, as shown in FIG. 6, SCRs (Silicon Controller Rectifiers) or the like are used in combination with a Tripping Solenoid to both (a) break the LIVE connection to the LOAD in the event of tripping condition, and (b) to close and maintain the connection between LIVE and LOAD for normal operation. U.S. Pat. No. 10,439,387, issued Oct. 10, 2019, which is incorporated herein by reference in its entirety, provides an example. In such configurations, however, the SCR may inadvertently close the LIVE/LOAD connection if any current runs through the SCR, including residual currents. Additionally, SCR components sometimes fail, for example, by having a faulty gate that causes a continuous electrical connection between anode and cathode without regarding to the control signals received. Under such circumstances, a faulty SCR may cause a continuous improper load to be placed on the solenoid, which may result in damage to the solenoid—and further resulting safety risks.

Accordingly, it may be advantageous if the SCR circuit is physically disconnected in the trip state.

It would be further advantageous to reduce or eliminate multiple tripping phenomena, which is among the most common problems affecting circuit interrupters.

SUMMARY

The present disclosure provides a description of apparatuses, systems, and methods to address the perceived needs and desires described above.

In one example, a reset switch assembly is provided. The reset switch assembly may include a reset button assembly, a slider, a leaf switch, and a trip coil assembly. The slider may have at least a first slider position and a second slider position. In the first slider position, the trip coil assembly may engage the slider to the reset button assembly. The leaf switch may be biased to a closed position. In in the second slider position, the slider may maintain the leaf switch in an open position.

The reset switch assembly may further include a reset spring and a slider spring. The reset button assembly may be biased upward by the reset spring. The slider may be biased downward by the slider spring.

The reset switch assembly may further include a middle barrier bracket. The reset spring may be disposed between an underside surface of a reset button of the reset button assembly and an upper surface of the middle barrier bracket. The slider spring may be disposed between a lower surface of the middle barrier bracket and an upper spring receiving surface of the slider.

The middle barrier bracket may define a reset button receiving passage. At least a portion of a reset button may be surrounded by the reset button receiving passage.

The leaf switch may include a first blade and a second blade. The slider may include a protruding point. The protruding point may be configured to separate the first blade and the second blade when the slider is in the second slider position.

The slider may further include a slider side opening and a slider vertical passage. The slider side opening may be configured to receive at least a portion of the trip coil assembly when the trip coil assembly is not energized. At least a portion of the reset button assembly may be surrounded by the slider vertical passage.

The reset switch assembly may further include a slider spring. The slider may further include an upper spring receiving surface. The upper spring receiving surface may receive the slider spring and may surround a top of the slider vertical passage.

The blade seat may include an interior recess and a blade seat side opening. The blade seat side opening may be configured to receive at least a portion of the trip coil assembly when the trip coil assembly is not energized. The slider may be disposed within the blade seat interior recess. The blade seat interior recess may be configured to permit the slider to vertically move between at least the first slider position and the second slider position.

The blade seat may include a first blade recess and a second blade recess. The leaf switch may include a first blade and a second blade. The first blade may be disposed in the first blade recess and the second blade may be disposed in the second blade recess.

The reset switch assembly may further include a circuit board. The blade seat may be secured to the circuit board. The first blade may be electronically connected to a first node of the circuit board and the second blade may be electronically connected to a second node of the circuit board. The first blade may be embedded within the circuit board and the second blade may be embedded within the circuit board.

The trip coil assembly may include a trip coil, a trip coil spring, and a trip iron core. The trip coil spring may be biased to push the trip iron core away from the trip coil when the trip coil is not energized. The trip coil may be configured to pull the trip iron core towards the trip coil when the trip coil is energized.

The trip iron core may further include a trip iron core tip. The reset button assembly may further include a reset button and a reset rod. The reset rod may define a reset rod locking hole, which may be configured to receive the trip iron core tip.

The slider may include a slider side opening and a slider vertical passage. The slider side opening may be configured to receive the trip iron core tip. At least a portion of the reset rod may be surrounded by the slider vertical passage. The trip coil assembly may be configured to engage the slider to the reset button assembly by inserting the trip iron core tip through both the slider side opening and the reset rod locking hole.

The reset rod may be configured to guide the trip iron core tip into the reset rod locking hole when both the trip coil assembly is not energized and the reset button is fully depressed.

The reset rod may include a reset rod main portion, a reset rod end portion, and a reset rod angled portion. The reset rod end portion may not be coplanar with the reset rod. The reset rod angled portion may connect the reset rod end portion to the reset rod main portion.

In another example, a circuit interrupter is provided. The circuit interrupter may comprise a reset switch assembly disclosed herein and a circuit board with circuit interrupter circuitry.

The circuit interrupter circuitry may include a SCR configured to energize and deenergize a trip coil of the trip coil assembly.

The circuit interrupter circuitry may be configured such that when the leaf switch is closed, the gate of the SCR is connected to ground and SCR is powered. The circuit interrupter circuitry may be configured such that when the leaf switch is open the gate of the SCR is disconnected and the SCR is unpowered.

The SCR may be configured to energize the trip coil assembly when it receives a trip signal and the leaf switch is closed.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate certain embodiments of the present disclosure and together with the description, serve to explain the principles of this disclosure.

DETAILED DESCRIPTION

Reference will now be made in detail to the present exemplary embodiments, examples of which are illustrated in the accompanying drawings. Wherever possible, the same reference numbers will be used throughout the drawings to refer to the same or like parts. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

Robust Reset Switch Assembly Mechanical Components

Figure 4:
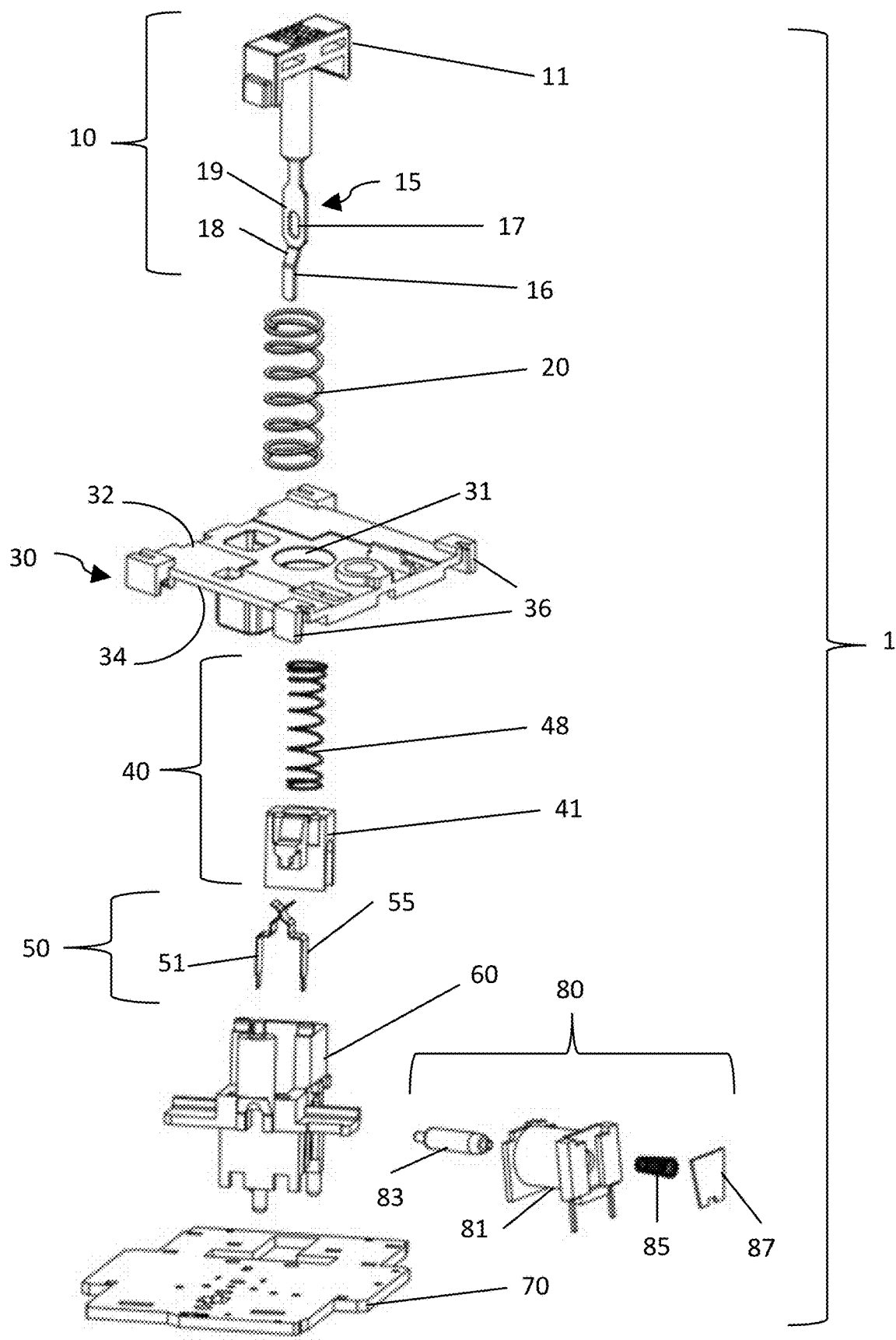
FIG. 4 is an exploded view of an embodiment the exemplary robust reset switch incorporated into the circuit interrupter of FIG. 1, consistent with the present disclosure.

With reference to FIG. 4, an exploded view of an embodiment of robust reset switch assembly 1 is provided. Robust reset switch assembly 1 may comprise reset button assembly 10, reset spring 20, middle barrier bracket 30, slider assembly 40, leaf switch 50, blade seat 60, circuit board 70, and trip coil assembly 80.

Figure 1:
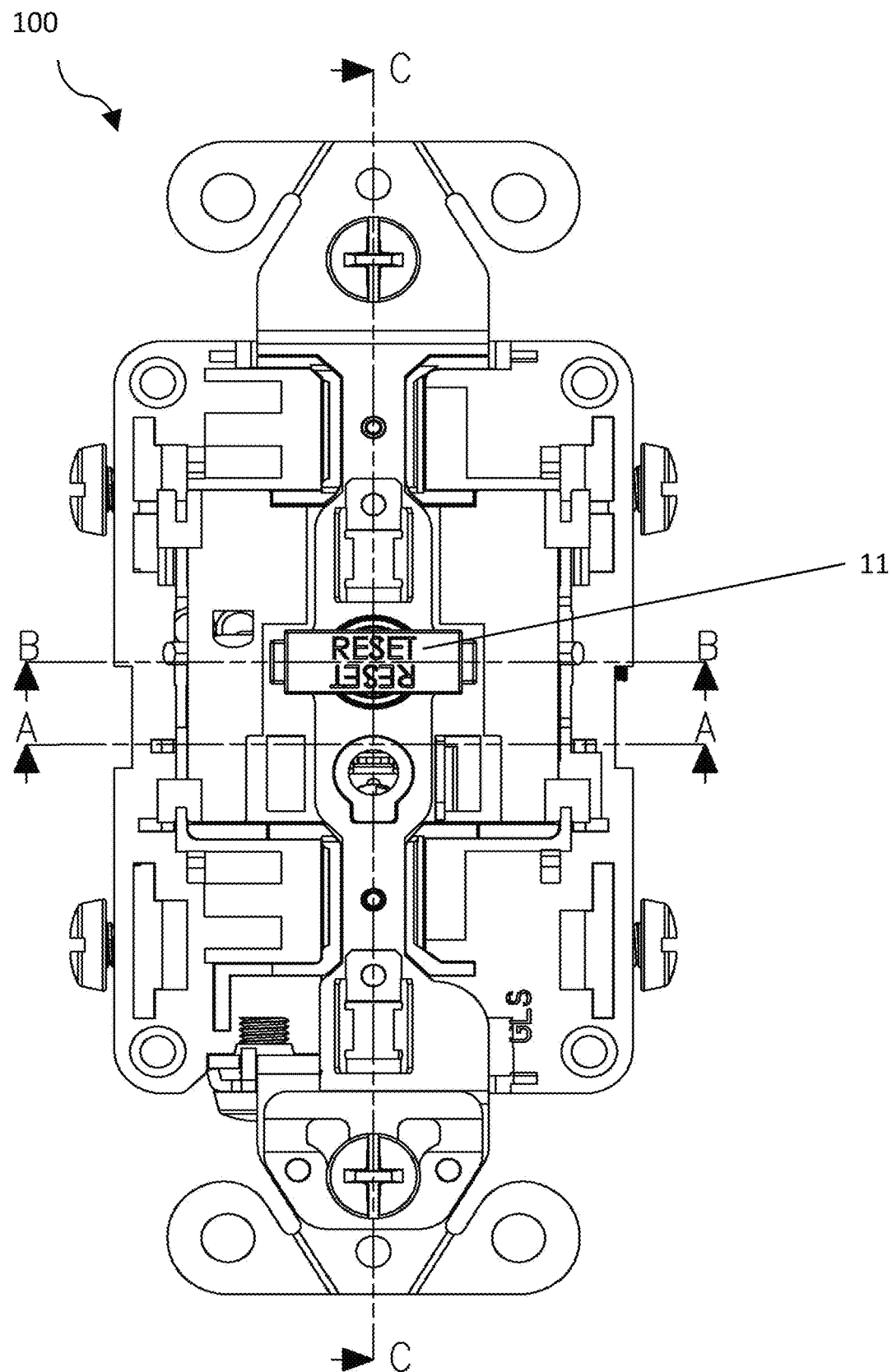
FIG. 1 is a front view of an embodiment of a circuit interrupter with an exemplary robust reset switch, consistent with the present disclosure.
Figure 2A:
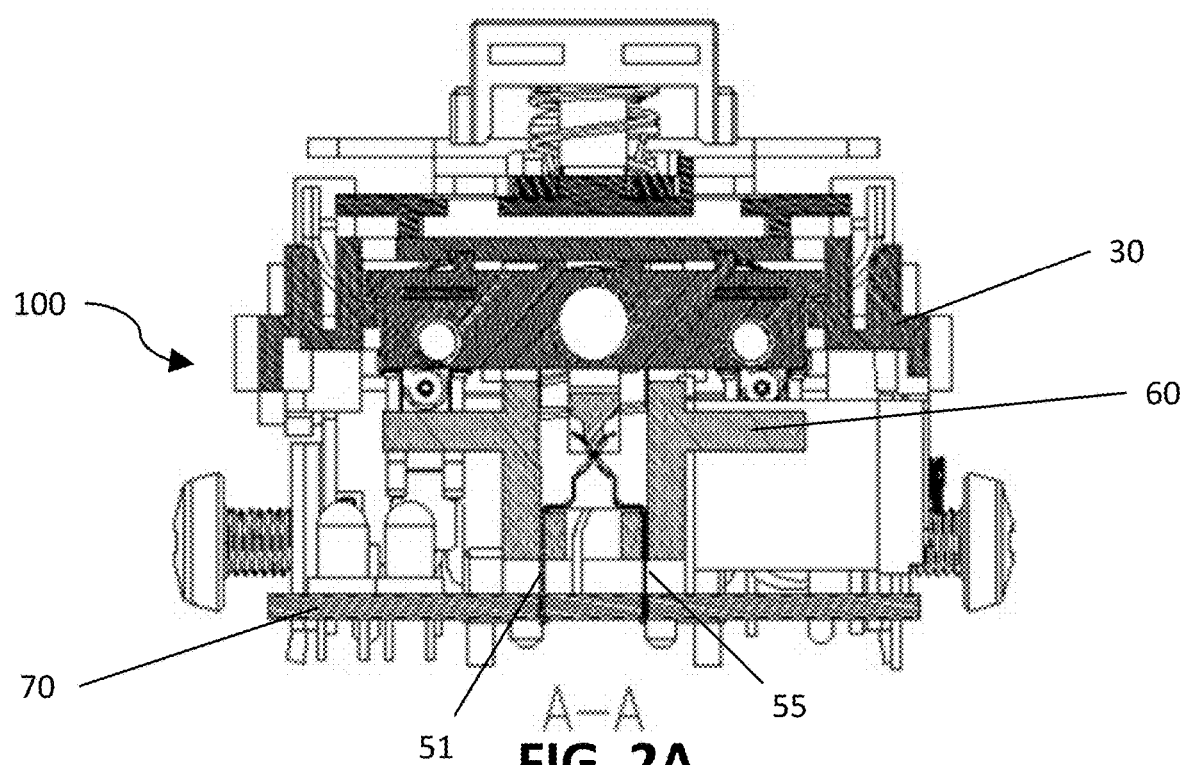
FIGS. 2A, 2B, and 2C are cross-sectional views of the circuit interrupter of FIG. 1, taken at A-A, B-B, and C-C, respectively, consistent with the present disclosure.
Figure 2B:
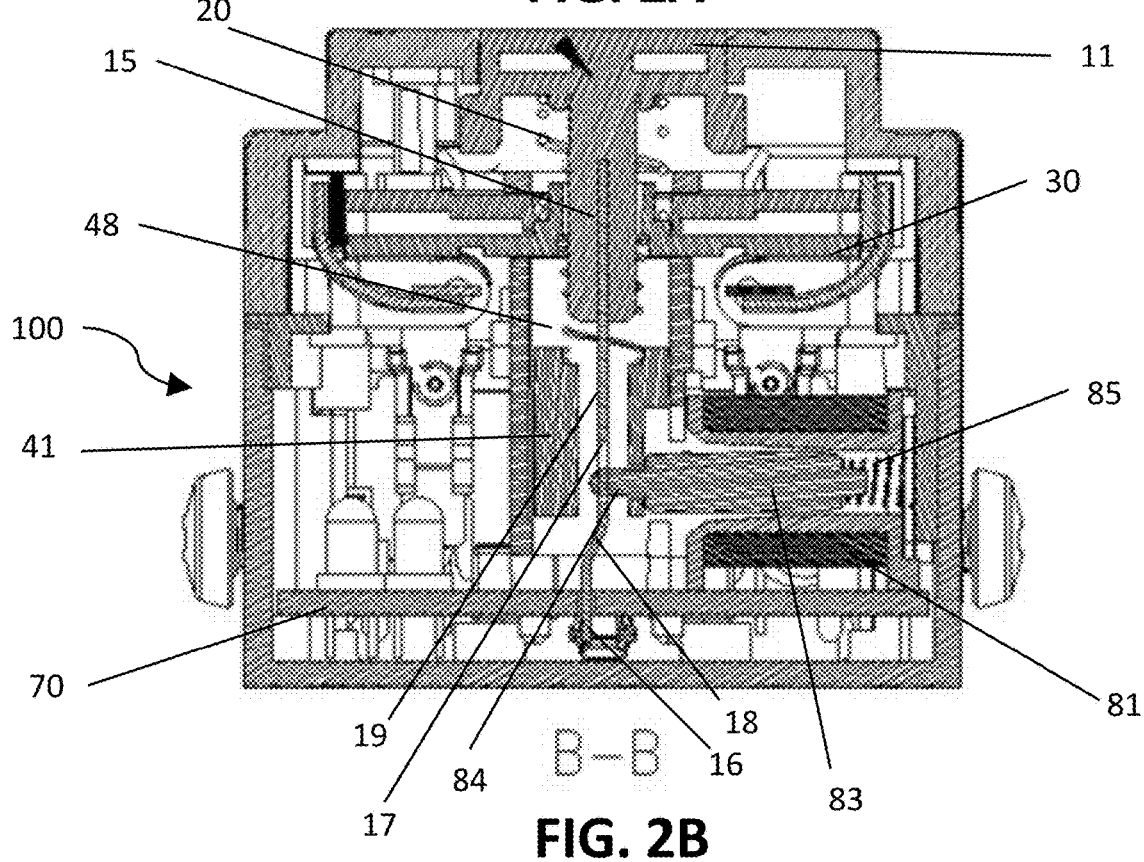
Figure 2C:
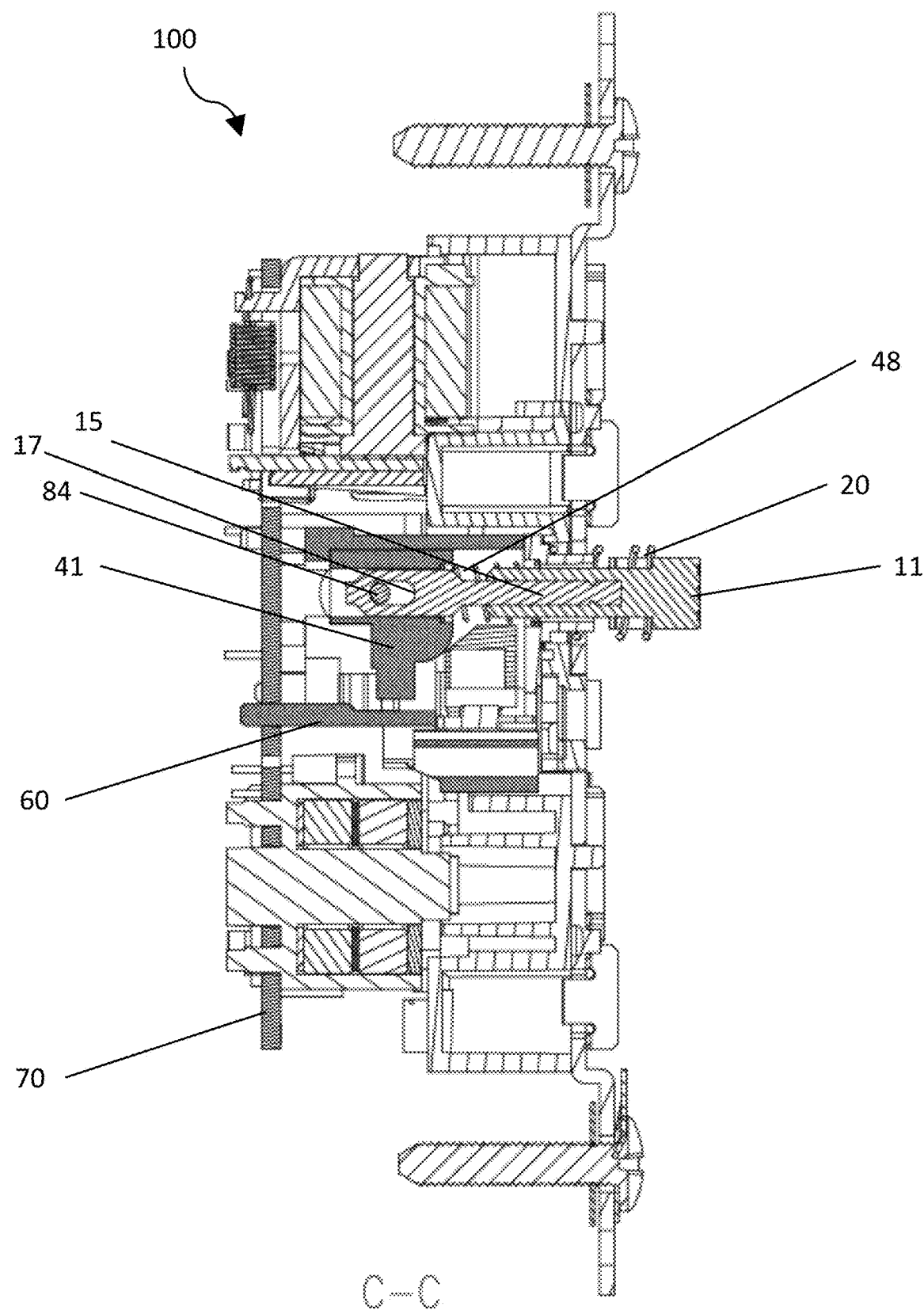
Figure 3A:
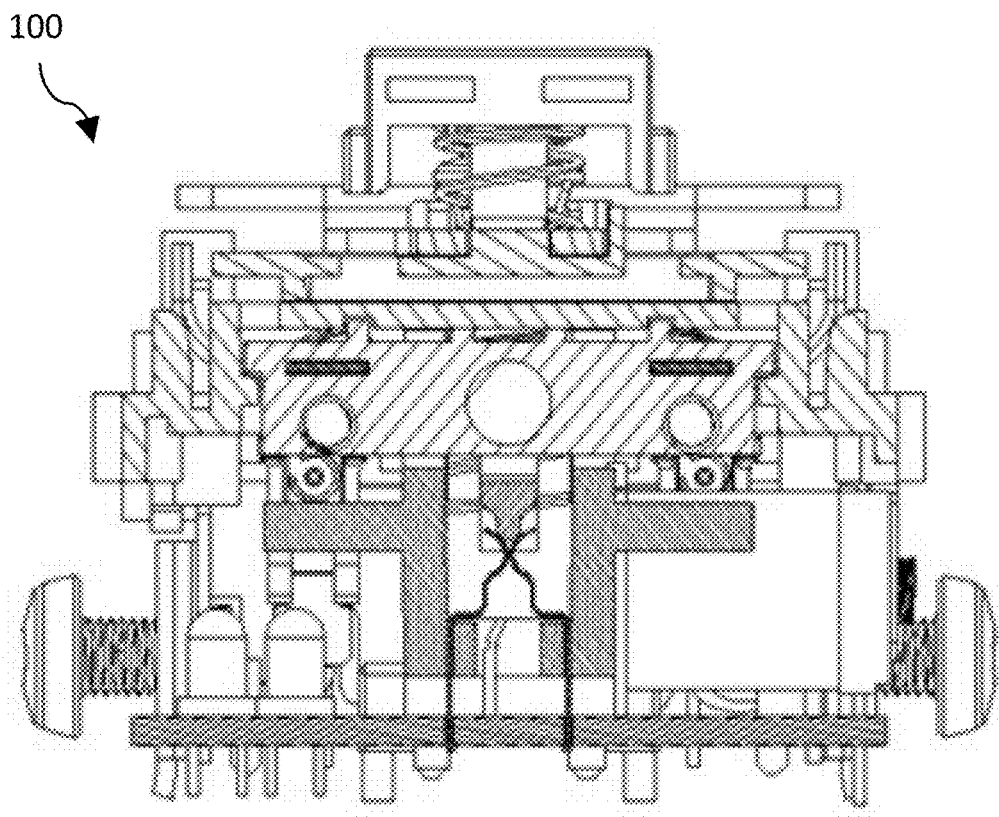
FIGS. 3A and 3B are cross-sectional views of the circuit interrupter of FIG. 1, with the robust reset switch embodiment in a first and second position, respectively, consistent with the present disclosure.

Reset switch assembly 1 may be assembled within circuit interrupter 100, which is depicted from various perspectives and in various states in FIGS. 1, 2A, 2B, 2C, 3A, and 3B. FIG. 1 depicts relevant portions of an exemplary circuit interrupter 100 from the front; FIGS. 2A, 2B, and 2C depict cross-sectional views of the circuit interrupter 100 taken at positions A-A, B-B, and C-C of FIG. 1, respectively. However, it may be noted that FIG. 2B may also depict a housing portion not shown in FIG. 1. FIGS. 3A and 3C depict cross-sectional views of the circuit interrupter 100 taken at position A-A, but in the normal operational state and tripped state, respectively. Although circuit interrupter 100 is depicted as an electrical outlet-interrupter, this disclosure is not so limited; other forms of circuit interrupters known in the art, such as those intended for fuse box installation and inline cord interrupters, are also specifically contemplated.

Reset button assembly may comprise a reset button 11 and reset rod 15 connected to reset button 11, as depicted in, for example, FIGS. 4, 2B, and 2C. Reset rod 15 may comprise reset rod main portion 19, which may define reset rod locking hole 17. As may be observed in, for example, FIG. 2B, reset rod locking hole 17 may receive trip iron core tip 84 of the trip coil assembly 80. Reset rod 15 may further comprise reset rod end portion 16, which may be non-coplanar with, but parallel to, reset rod main portion 19. Reset rod 15 may further comprise reset rod angled portion 18 as the angled connection between rod main portion 19 and reset rod end portion 16.

Reset rod end portion 16 may pass through physical gaps in circuit board 70, for example, when reset button 11 is fully pressed by a user.

Reset button 11 may be pressed by a user to place to circuit interrupter 100 into the normal operational (reset) state if interrupter 100 is in the tripped state and the tripping conditions have been resolved. Reset spring 20 may physically place reset button 11 into its original position after the user releases it. Reset spring 20 may be biased to pull the entire reset button assembly 10—and any engaged components upwards. As may be best viewed in FIGS. 2B and 2C, Reset spring 20 may be disposed between an underside surface of reset button 11 and reset spring receiving surface 32 of middle barrier bracket 30, or, alternatively, another non-moving physical component of circuit interrupter 100 or reset.

Middle barrier bracket 30 may comprise a topside reset spring receiving 32, an underside slider spring receiving surface 34, and a reset button assembly receiving passage 31. Reset button assembly receiving passage 31 may be configured to permit a substantial portion of reset button assembly 10 to pass therethrough, as shown, for example, in FIGS. 2B and 2C. In some embodiments, as shown, middle barrier bracket 30 may also comprise corner clips 36 to secure middle barrier bracket to other non-moving physical components of circuit interrupter 100, such as its housing.

Slider assembly 40 may comprise slider 41 and slider spring 48. Slider spring 48 may be disposed between underside slider spring receiving surface 34 of middle barrier bracket 30 and slider spring receiving surface 42 of slider 41. As such, slide spring biases slider 41 to a downward position. As depicted in greater detail in FIGS. 8A-8F from the front, open side, closed side, cross-sectional, top, and bottom perspectives, respectively, slider 41 may comprise slider spring receiving surface 42, slider vertical passage 47, slider side opening 46, slider side recess 48, and protruding point 45. Slider spring receiving surface 42 may surround and define the upper opening of slider vertical passage 47. Slider vertical passage 47 may be configured to permit passage of a substantial portion of reset rod 15 therethrough, as shown, for example, in FIGS. 2B and 2C.

Figure 3B:
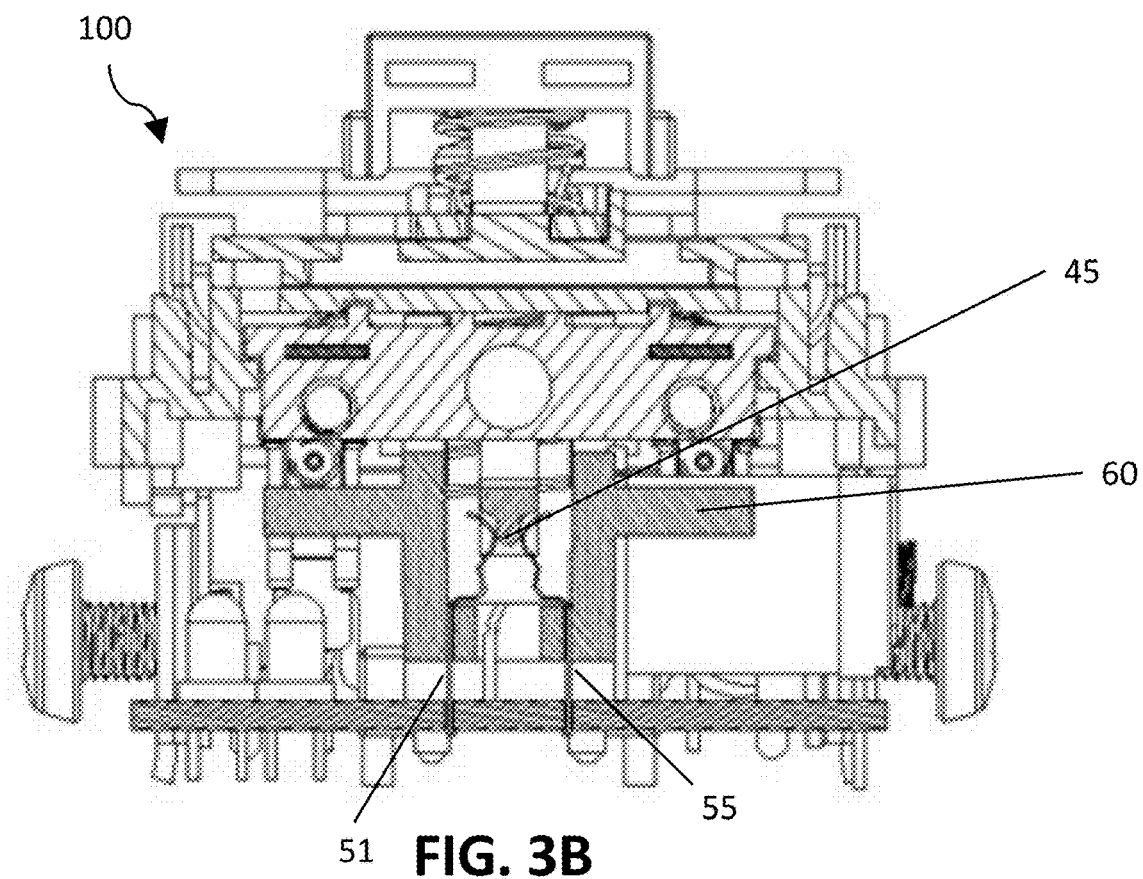

Leaf switch 51 may comprise first blade 51 and second blade 52. With reference to the circuit schematic of FIG. 5, leaf switch 51 is depicted as electrical switch element K. Bottom portions of blade 51 and second blade 52, respectively, may connect to separate electrical nodes on circuit board 70. In certain embodiments, for example, as depicted in FIGS. 2A, 3A, and 3B, the bottom portions of blade 51 and second blade 52, respectively may be disposed within circuit board 70.

A substantial portion of blades 51 and 52 may be disposed within blade seat 60. The top portions of the blades 51 and 52 may be metal springs configured to default an abutting position, for example as shown in FIGS. 2A and 3A. In such abutting position, blades 51 and 52 may be electrically connected and leaf switch 50 may be understood to be closed. As may be best observed in FIG. 3B, blades 51 and 52 are configured to allow their separation by protruding point 45 of slider 41.

Blade seat 60 may be installed on circuit board 80. It may be considered a non-moving physical component. As depicted in greater detail in FIGS. 7A-7D from the front, open side, top and bottom perspectives, respectively, blade seat 60 may comprise first blade receiving recess 61, second blade receiving recess 65, blade seat interior recess 67, and blade seat side opening 66.

FIGS. 9A-9E depicts slider 41 within blade seat 60 from the closed side, open side, top bottom, and cross-sectional perspectives. As may be observed, slider 41 may be movably disposed within blade seat 60; more specifically, slider 41 may be movably disposed within blade seat interior recess 67 to permit its vertical movement therein.

Trip coil assembly 80 may comprise trip coil 81, trip iron core 83, trip coil spring 85, and trip spring bracket 87. Trip coil 81 may correspond to electrical element T2 in FIG. 5. Trip spring bracket 87 may be affixed to one end of trip coil 8. Trip coil spring 85 may be disposed between trip spring bracket 87 and trip iron core 83 such that, when trip coil 81 is not energized, trip coil spring 85 may push trip iron core 83 out of trip coil 81. The energizing of trip coil 81 may generate an electro-magnetic field that is configured to pull trip iron core 83 back—against the force of trip coil 85—and substantially inside of trip coil 81.

Trip iron core 83 may comprise trip iron core tip 84. With reference to FIG. 2B and FIG. 2C, when trip coil 81 is not energized, trip iron core tip 84 is pushed through blade seat side opening 66, through slider side opening 46, and into reset rod locking hole 17. In some embodiments, portions of trip iron core 83 adjacent to tip 84 may also be pushed through blade seat side opening 66 and may be disposed within slider side recess 48. By way of this mechanism, reset button assembly 10 is engaged with slider 41 via trip iron core tip 84. In this position, reset spring 20 pulls up slider 41, overcoming the downward bias of slider spring 48. Slider 41's upward vertical position within blade seat 60 physically corresponds to an upward position of protruding point 45 of slider 41. Accordingly, provided that reset button 11 is not being pressed, the spring force of reset spring 20 may pull protruding point 45 away from blades 51 and 52, and enable leaf switch 50 to close, for example as shown in FIG. 3A. This is the normal operating (reset) position of a circuit interrupter 100 with a robust reset switch assembly 1. This upward vertical position of slider 41 within blade seat 60 may be maintained so long as trip coil 81 is not energized and the reset button assembly 10 is not forced down.

When the trip coil 81 is energized, trip iron core tip 84 is effectively withdrawn from at least slider side opening 46 and reset rod locking hole 17. When this occurs, the engagement is released. Without the engagement, the spring force provided by slider spring 48 may be sufficient to push slider 41 downward. In turn, this causes protruding point 45 to push downward and physically separate blades 51 and 52, thereby opening leaf switch 50. This is the tripped position of a circuit interrupter 100 with a robust reset switch assembly 1, as shown in FIG. 3B.

Robust Reset Switch Operation—Tripping

Figure 5:
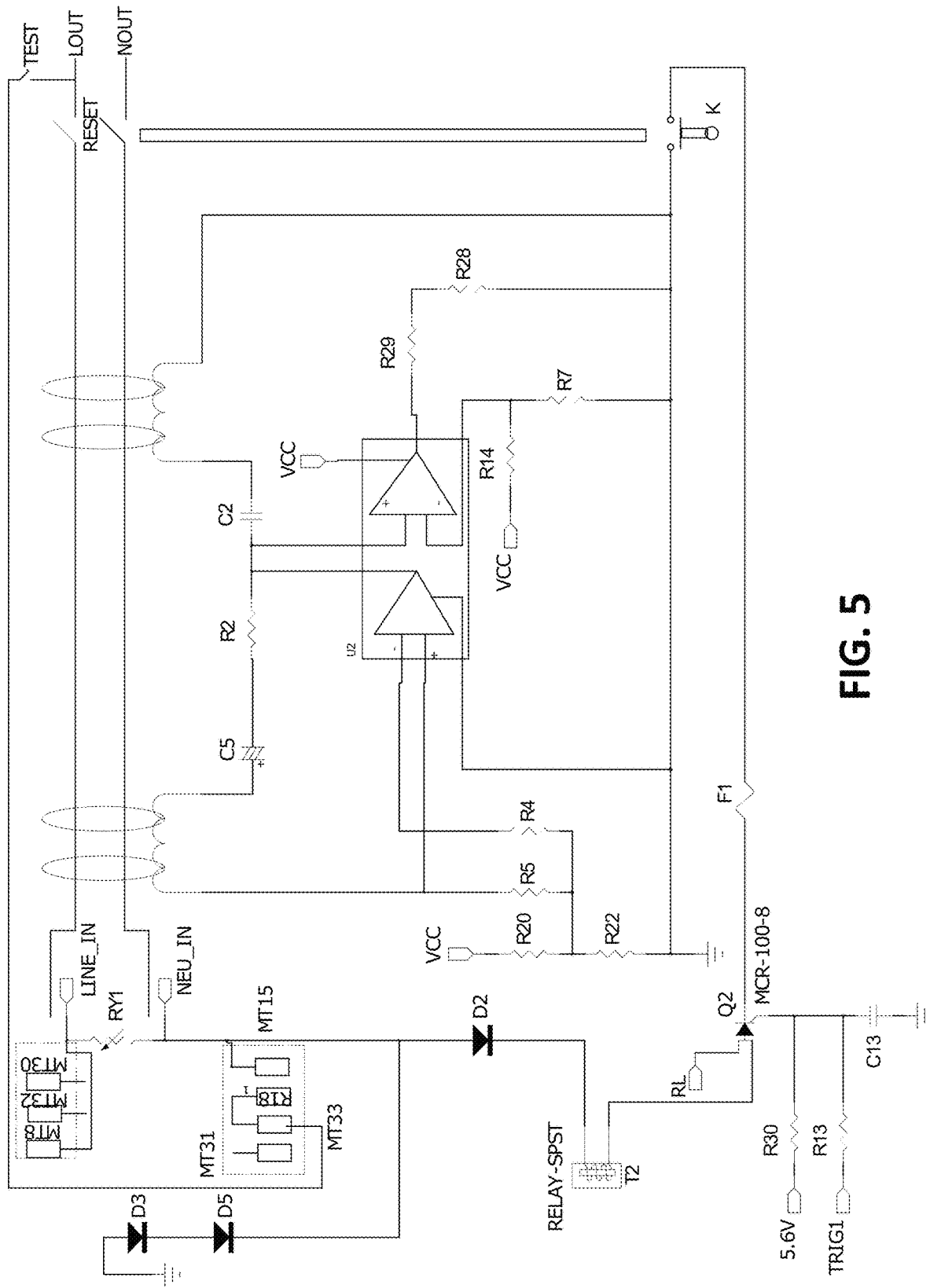
FIG. 5 depicts an exemplary circuit schematic of an embodiment of the circuit interrupter of FIG. 1, consistent with the present disclosure.
Figure 6:
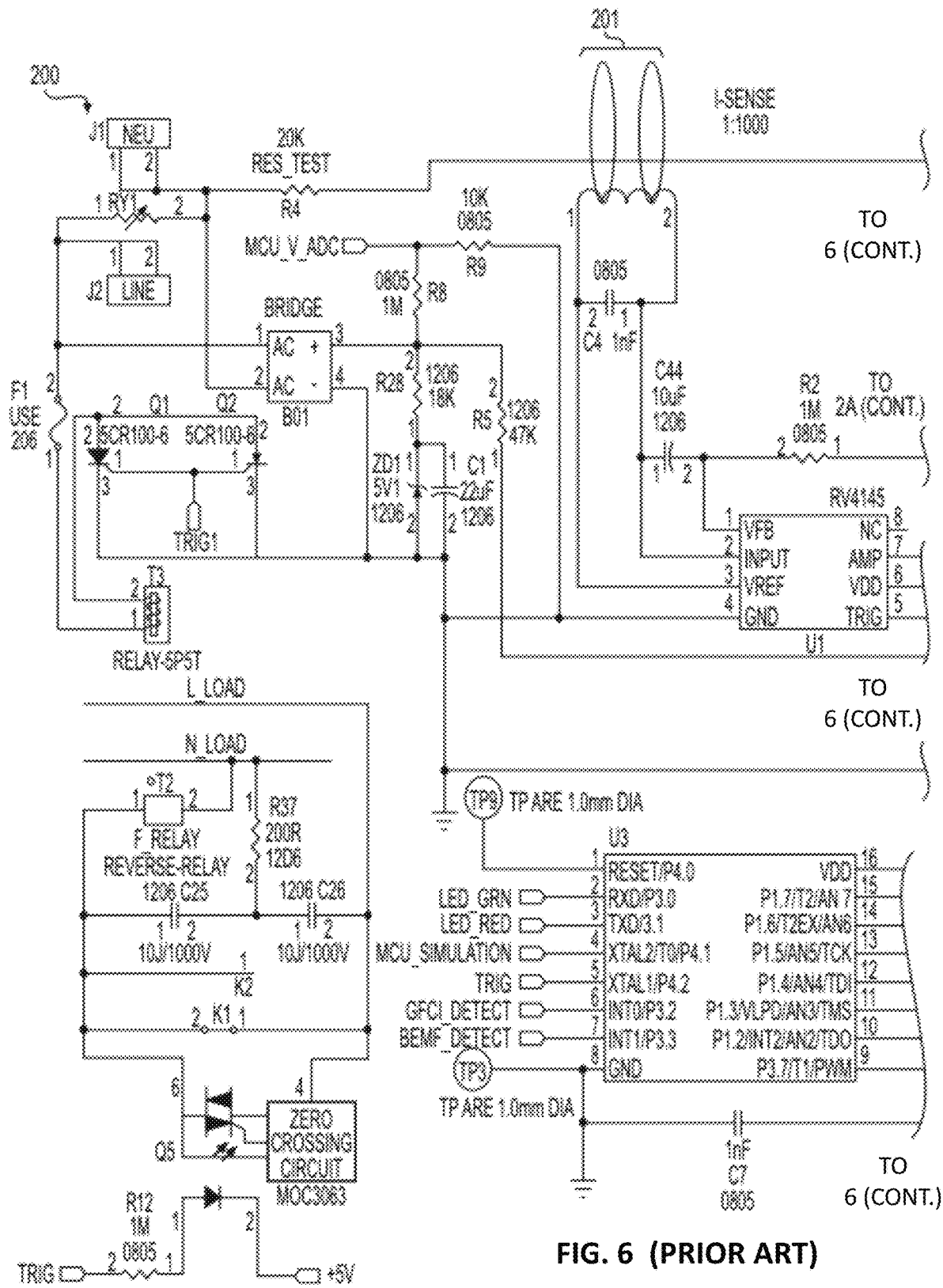
FIG. 6 depicts a prior art circuit schematic.
Figure 7A:
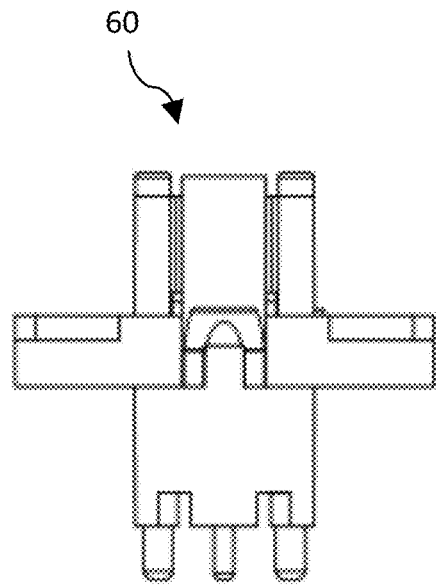
FIGS. 7A, 7B, 7C, and 7D depict front, open side, top, and bottom views, respectively of a blade seat of the exemplary robust reset switch embodiment of FIG. 4.
Figure 7B:
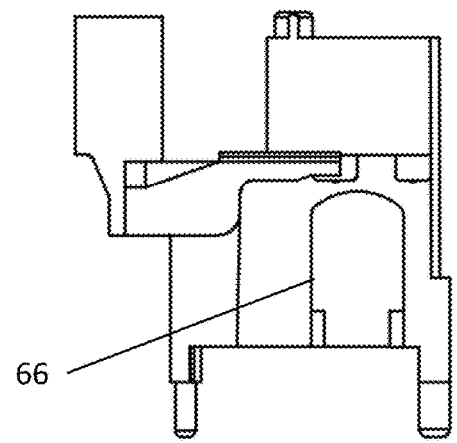
Figure 7C:
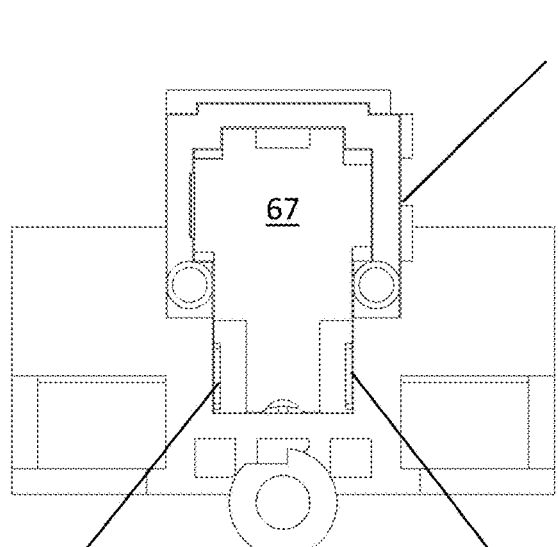
Figure 7D:
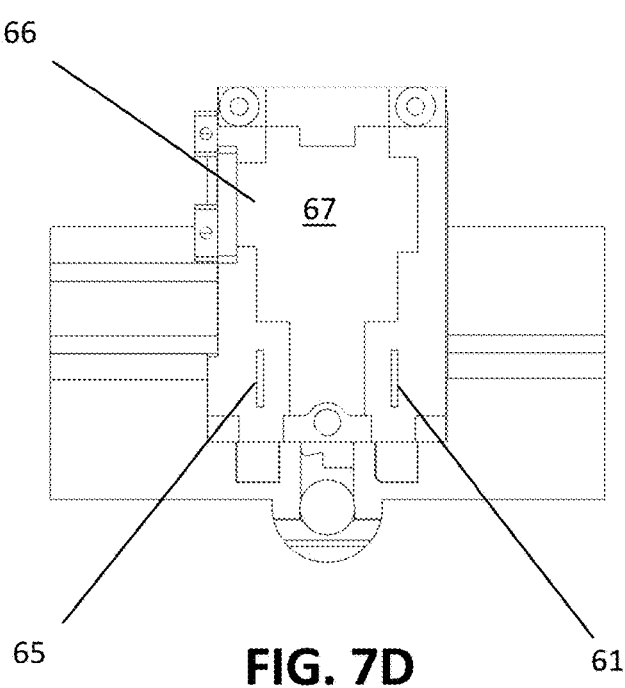
Figure 8A:
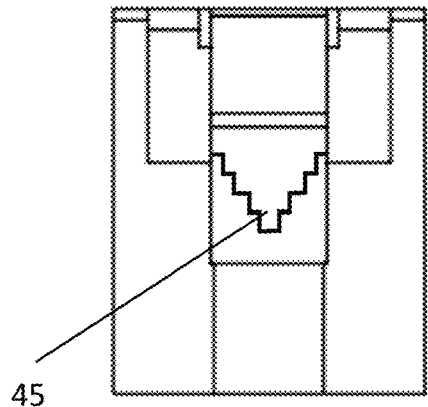
FIGS. 8A, 8B, 8C, 8D, 8E, and 8F depict front, open side, closed side, cross-sectional, top, and bottom views, respectively of a slider of the exemplary robust reset switch embodiment of FIG. 4.
Figure 8B:
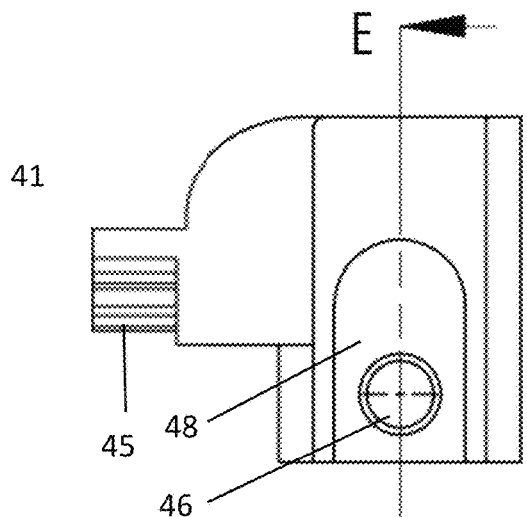
Figure 8C:
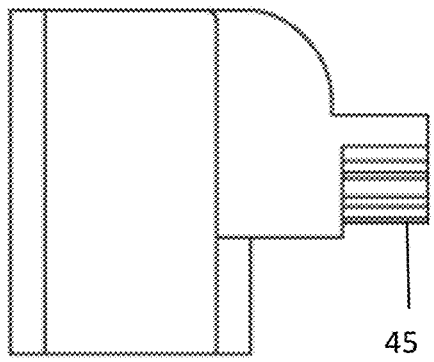
Figure 8D:
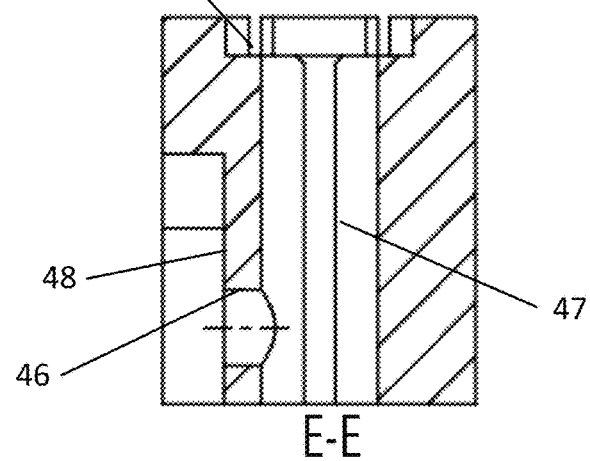
Figure 8E:
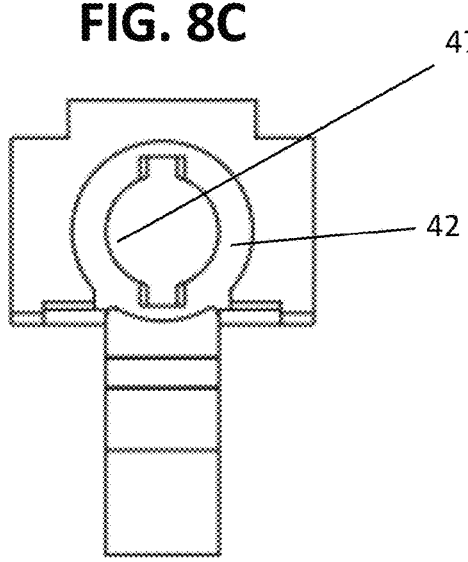
Figure 8F:
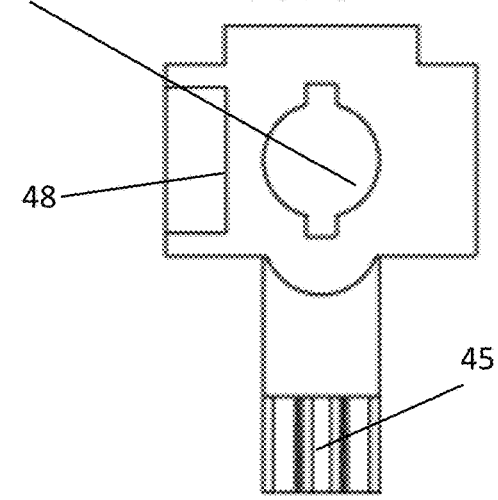
Figure 9A:
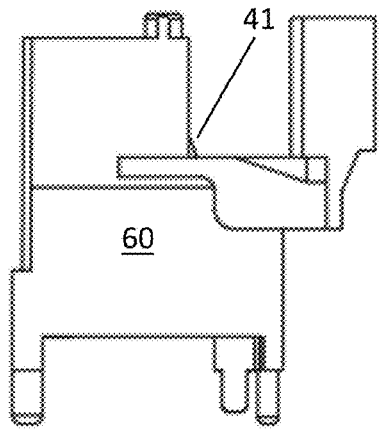
FIGS. 9A, 9B, 9C, 9D, and 9E depict closed side, open side, top, bottom, and cross-sectional views, respectively of a slider fitted in a blade seat of the exemplary robust reset switch embodiment of FIG. 4.
Figure 9B:
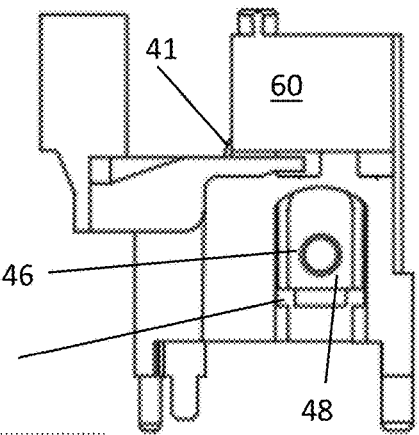
Figure 9E:
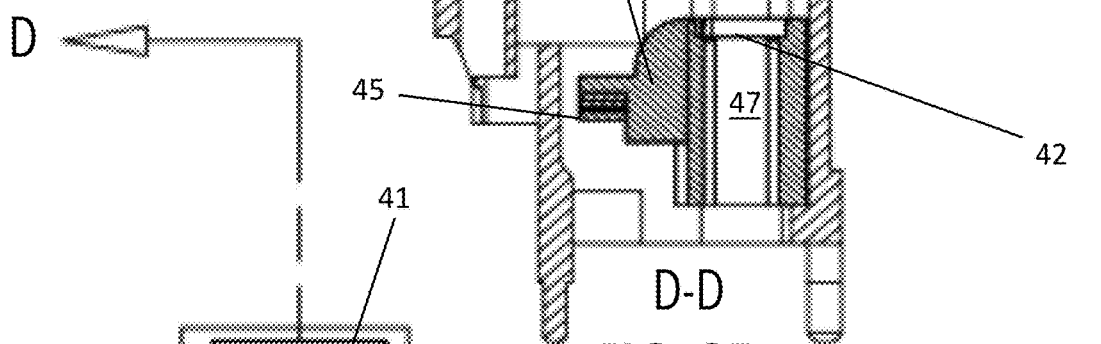
Figure 9C:
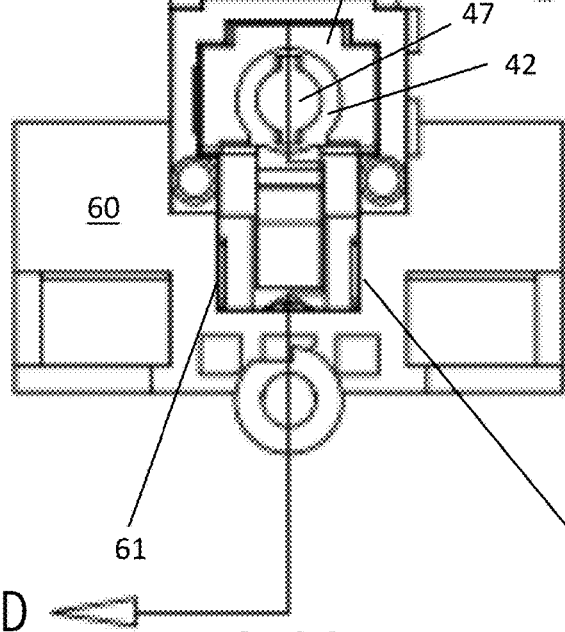
Figure 9D:
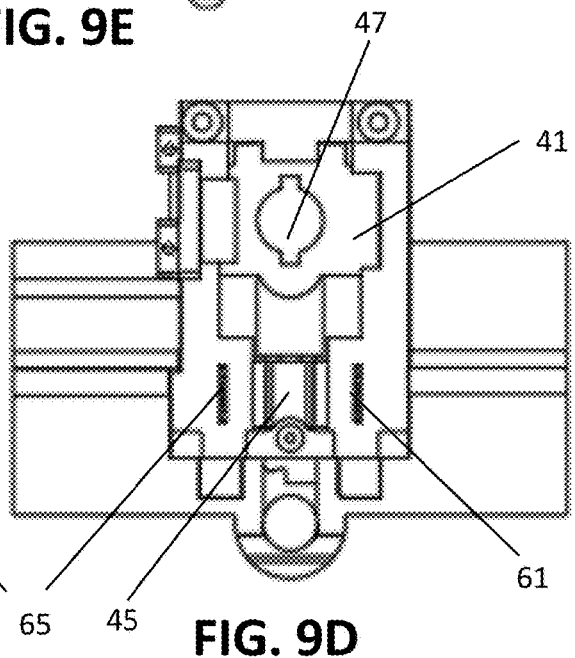

With reference to FIG. 5, a normally operating interrupter 100 may be tripped via a trip signal provided at TRIG1 by a controller/MCU (not shown in FIG. 5). As shown, such signal may be provided to the gate of the SCR, closing the anode and cathode of the SCR. This, in turn will energize relay T2/trip coil 81. The energizing of trip coil 81 will pull back trip iron core tip 84, allowing the reset button assembly to disengage from the slider, and permitting slider spring 48 to push protruding point 45 downward to separate blades 51 and 52, opening leaf switch 50.

With further reference to FIG. 5, when leaf switch 50/K is open, power is removed from thyristor Q2 (SCR). As a result, regardless of whether residual or other current remains flowing through thyristor Q2, relay/coil T2 and related circuit components—as well as thyristor Q2 itself will be deenergized. Accordingly, these circuit elements will not be forced to continuously conduct electricity while the tripped condition remains. This decreases the likelihood of failure of these components and should thereby extend the operational life of the circuit interrupter 100.

Indeed, the opening of leaf switch 50/K provides protection even in the circumstance that thyristor Q2 has a faulty gate that improperly closes the circuit between the anode and the cathode. In such circumstances, the open leaf switch 50/K will prevent the solenoid—and other electronic components from being powered.

In prior art circuits, which lack mechanisms to provide the physically-stable open circuit of the open leaf switch 50 here, there is a risk that the continuously loading of a tripping solenoid may result in a permanent faulty (or burning coil). Accordingly, the instant disclosure provides may be understood to provide a safety improvement.

Robust Reset Switch Operation—Resetting

Resetting a tripped circuit interrupter 100 with a robust reset switch 1 may proceed with a user pressing reset button 11. This causes reset button assembly 10 to proceed downward, until trip iron core tip 84 re-engages into reset rod locking hole 17, as depicted in FIG. 2B. As may be observed in FIGS. 2B and 4, reset rod end portion 16 may be disposed parallel to and set back (with respect to slider assembly 40) from the reset rod main portion 19. It may be observed that reset rod end portion 16 and reset rod angled portion 18 connected thereto may guide trip iron core tip 84 into reset rod locking hole 17, with pressure from the angled portion 18 causing trip coil spring 85 to compress appropriately to enable alignment engagement.

Once reset button 11 is released, reset button assembly 10 is brought upwards through the action of reset spring 20. Because slider 41 is engaged to reset button assembly 10 via trip iron core 84, slider 41 is brought upwards notwithstanding the downward pressure of slider spring 48. Protruding point 45 is bought upwards with slider 41, which permits first and second blades 51/55 of leaf switch 50 to reconnect, for example as shown in FIG. 3A. The SCR/thyristor is repowered. Assuming that the issue that caused the previous trip has been remedied, the interrupter/outlet 100 may resume normal operation. If, however, the trip condition remains, the trip coil 81 will be re-energized and interrupter 100 will return to a tripped state.

In the preceding specification, various preferred embodiments have been described with reference to the accompanying drawings. It will, however, be evident that various other modifications and changes may be made thereto, and additional embodiments may also be implemented, without departing from the broader scope of the invention as set forth in the claims that follow.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

We claim:

1. A reset switch assembly, comprising:
   a reset button assembly;
   a slider with at least a first slider position and a second slider position;
   a leaf switch; and
   a trip coil assembly,
   wherein:
      in the first slider position, the trip coil assembly engages the slider to the reset button assembly;
      the leaf switch is biased to a closed position; and
      in the second slider position, the slider maintains the leaf switch in an open position.

2. The reset switch assembly of claim 1, further comprising:
   a reset spring; and
   a slider spring,
   wherein:
      the reset button assembly is biased upward by the reset spring; and
      the slider is biased downward by the slider spring.

3. The reset switch assembly of claim 2, further comprising:
   a middle barrier bracket,
   wherein:
      the reset spring is disposed between an underside surface of a reset button of the reset button assembly and an upper surface of the middle barrier bracket; and
      the slider spring is disposed between a lower surface of the middle barrier bracket and an upper spring receiving surface of the slider.

4. The reset switch assembly of claim 3, wherein:
   the middle barrier bracket defines a reset button receiving passage; and
   at least a portion of a reset button is surrounded by the reset button receiving passage.

5. The reset switch assembly of claim 1, wherein:
   the leaf switch comprises a first blade and a second blade;
   the slider further comprises a protruding point; and
   the protruding point is configured to separate the first blade and the second blade when the slider is in the second slider position.

6. The reset switch assembly of claim 5, wherein:
   the slider further comprises a slider side opening and a slider vertical passage;
   the slider side opening is configured to receive at least a portion of the trip coil assembly when the trip coil assembly is not energized; and
   at least a portion of the reset button assembly is surrounded by the slider vertical passage.

7. The reset switch assembly of claim 6, further comprising a slider spring, wherein:
   the slider further comprises an upper spring receiving surface;
   the upper spring receiving surface receives the slider spring; and the upper spring receiving surface surrounds a top of the slider vertical passage.

8. The reset switch assembly of claim 1, wherein:
a blade seat comprises an interior recess and a blade seat side opening;
the blade seat side opening is configured to receive at least a portion of the trip coil assembly when the trip coil assembly is not energized;
the slider is disposed within the blade seat interior recess; and
the blade seat interior recess is configured to permit the slider to vertically move between at least the first slider position and the second slider position.

9. The reset switch assembly of claim 8, wherein:
the blade seat comprises a first blade recess and a second blade recess;
the leaf switch comprises a first blade and a second blade;
the first blade is disposed in the first blade recess;
the second blade is disposed in the second blade recess.

10. The reset switch assembly of claim 9, further comprising a circuit board, wherein:
the blade seat is secured to the circuit board;
the first blade is electronically connected to a first node of the circuit board; and
the second blade is electronically connected to a second node of the circuit board.

11. The reset switch assembly of claim 10, wherein:
the first blade is embedded within the circuit board; and
the second blade is embedded within the circuit board.

12. The reset switch assembly of claim 1, wherein:
the trip coil assembly comprises a trip coil, a trip coil spring, and a trip iron core;
the trip coil spring is biased to push the trip iron core away from the trip coil when the trip coil is not energized; and
the trip coil is configured to pull the trip iron core towards the trip coil when the trip coil is energized.

13. The reset switch assembly of claim 12, wherein:
the trip iron core further comprises a trip iron core tip;
the reset button assembly comprises a reset button and a reset rod;
the reset rod defines a reset rod locking hole; and
the reset rod locking hole is configured to receive the trip iron core tip.

14. The reset switch assembly of claim 13, wherein:
the slider comprises a slider side opening and a slider vertical passage;
the slider side opening is configured to receive the trip iron core tip; and
at least a portion of the reset rod is surrounded by the slider vertical passage; and
the trip coil assembly is configured to engage the slider to the reset button assembly by inserting the trip iron core tip through both the slider side opening and the reset rod locking hole.

15. The reset switch assembly of claim 14, wherein:
the reset rod is configured to guide the trip iron core tip into the reset rod locking hole when the trip coil assembly is not energized and the reset button is fully depressed.

16. The reset switch assembly of claim 15, wherein:
the reset rod comprises a reset rod main portion, a reset rod end portion, and a reset rod angled portion;
the reset rod end portion is not coplanar with the reset rod; and
the reset rod angled portion connects the reset rod end portion to the reset rod main portion.

17. A circuit interrupter comprising:
the reset switch assembly of claim 1; and
a circuit board with circuit interrupter circuitry.

18. The circuit interrupter of claim 17, wherein:
the circuit interrupter circuitry comprises at least a SCR configured to energize and deenergize a trip coil of the trip coil assembly.

19. The circuit interrupter of claim 18, wherein the circuit interrupter circuitry is configured such that:
when the leaf switch is closed the gate of the SCR is connected to ground and SCR is powered; and
when the leaf switch is open the gate of the SCR is disconnected and the SCR is unpowered.

20. The circuit interrupter of claim 19, wherein:
the SCR is configured to energize the trip coil assembly when it receives a trip signal and the leaf switch is closed.

* * * * *